US008304641B1

(12) United States Patent
Stewart

(10) Patent No.: US 8,304,641 B1

(45) Date of Patent: Nov. 6, 2012

(54) SYSTEM AND METHOD FOR LEARNING AND PLAYING MUSIC ON A WOODWIND INSTRUMENT

(76) Inventor: Chelsea M. Stewart, Derry, NH (US)

(*) Notice: Subject to any disclaimer, the term of this patent is extended or adjusted under 35 U.S.C. 154(b) by 0 days.

(21) Appl. No.: 13/098,905

(22) Filed: May 2, 2011

Related U.S. Application Data

(60) Provisional application No. 61/331,034, filed on May 4, 2010.

(51) Int. Cl.
*G09B 15/02* (2006.01)

(52) U.S. Cl. ........................................................ 84/483.2

(58) Field of Classification Search ................ 84/470 R, 84/471 R, 477 R, 483.1, 483.2, 484, 485 R
See application file for complete search history.

(56) References Cited

U.S. PATENT DOCUMENTS 5,496,179 A * 3/1996 Hoffman ........................ 434/433
6,660,921 B2 12/2003 Deverich
6,987,220 B2 1/2006 Holcombe
2002/0050206 A1 5/2002 MacCutcheon
2004/0007118 A1* 1/2004 Holcombe .................. 84/483.2

* cited by examiner

*Primary Examiner* — Kimberly Lockett

(74) *Attorney, Agent, or Firm* — William A. Loginov; Loginov & Associates, PLLC

(57) ABSTRACT

The invention provides a system for associating sheet notes with a woodwind instrument having finger-holes includes a plurality of note indicators, wherein the note indicators are each provided with a discrete color-code and define an annulus sized and arranged to be located on each of the finger holes respectively so that the finger holes can be selectively open and closed by a player's fingers and a sheet music having the sheet notes, wherein each of the sheet notes includes one or more colors that fill the note head and that correspond to a selection of the finger holes that plays a musical version of each of the sheet notes.

8 Claims, 4 Drawing Sheets

200 202 224 216 230 214 230 230 212 222 230 230 210 230 220 218 230 230 OD 310 210 212 214 216 218 220 222

SYSTEM AND METHOD FOR LEARNING AND PLAYING MUSIC ON A WOODWIND INSTRUMENT

FIELD OF THE INVENTION

This application claims the benefit of U.S. Provisional Application Ser. No. 61/331,034, filed May 4, 2010, entitled SYSTEM AND METHOD FOR LEARNING AND PLAYING MUSIC ON A WOODWIND INSTRUMENT, by Chelsea M. Stewart, now Chelsea M. Hunnewell, the entire disclosure of which is herein incorporated by reference.

FIELD OF THE INVENTION

The present invention relates to teaching music. More particularly, the present invention relates to facilitating the learning and playing of music on a woodwind instrument.

BACKGROUND OF THE INVENTION

Learning to play an instrument can be challenging. Children at a young age especially have difficulty learning and playing instruments because of a difference in learning ability, or the presence of a learning disability.

One problem children encounter is visualizing sheet notes and then trying to associate those notes with the corresponding keys of the instrument. The problem is further compounded when the child is trying to read and play sheet music with a fast tempo and with notes requiring quick manipulation of the fingers. A teacher can instruct the child how and where to place his or her fingers on the instrument, but more instruction is needed to facilitate the development of the child's musical coordination.

Finger-holed woodwind instruments, such as recorders and simple flutes, are commonly used to teach children how to play an instrument. The recorder, due in part to its simplicity, low-cost, and portable size, is a popular choice among schools and music educators alike.

Like other instruments, the selection of the correct notes requires the manipulation of a multiplicity of fingers and underlying holes, some being opened and some being closed to address each discrete note. Those selections need to become a muscle memory based upon visualizing the sheet note. However, as stated above, some children may find the abstraction of the sheet notes difficult to convert into reliable finger positions.

One technique for facilitating the association of sheet music with the physical fingering exercise is to provide numbers or other indicia corresponding to the particular finger holes to the music score. That is, each sheet note is given an underscore or overscore with the finger-hole numbers to be keyed. This is disadvantageous in that the child's attention shifts from the note to the number sequence and the association between keys and sheet notes on the page is never really made.

Accordingly, it is desirable to provide a system and method for teaching woodwind instruments having multiple finger holes, like a recorder, that clearly indicates the correct finger positions to be manipulated for each note in a manner understandable to a child. The system and method should also desirably allow for direct association between each sheet note and the keys to be played.

SUMMARY OF THE INVENTION

This invention overcomes the disadvantages of the prior art by providing a system and method that clearly indicates the correct finger positions to be played on a instrument having multiple finger-holes, like a recorder. The system for associating sheet notes with a woodwind instrument having finger-holes includes a plurality of note indicators, wherein the note indicators are each provided with a discrete color-code and define an annulus sized and arranged to be located on each of the finger holes respectively so that the finger holes can be selectively open and closed by a player's fingers and a sheet music having the sheet notes, wherein each of the sheet notes includes one or more colors that fill the note head and that correspond to a selection of the finger holes that plays a musical version of each of the sheet notes.

The method of associating sheet notes with a woodwind instrument having finger holes includes arranging a plurality of color-coded note indicators over each of the finger-holes and displaying a sheet music having the sheet notes, wherein each of the heads of the sheet notes includes one or more colors that correspond to a selection of the finger holes that plays a musical version of each of the sheet notes.

In an illustrative embodiment the various colors can appear as stripes within the colored-in note heads. The sheet notes can be provided on a large, highly visible sheet or display of the music score.

In further embodiments, the annular note indicators can be provided as self-adhesive stickers that are designed to be removed from peelable backing sheets, and applied according to instructions to each recorder/instrument. The sheets and instructions can be part of a kit that includes appropriately colored-in sheet music or software/web-link that allows access to a displayed or projected version of the colored-in music score.

BRIEF DESCRIPTION OF THE DRAWINGS

The invention description below refers to the accompanying drawings, of which.

DETAILED DESCRIPTION

There is provided a system for associating sheet notes with the notes of an instrument. The system includes color-coded note indicators that are arranged with respect to the respective finger holes of a woodwind instrument, and corresponding sheet music that have color-coded notes associated with the note indicators. A user is provided an additional stimulus from the colors in direct association with each hole to facilitate the learning and playing of music.

Figure 1:
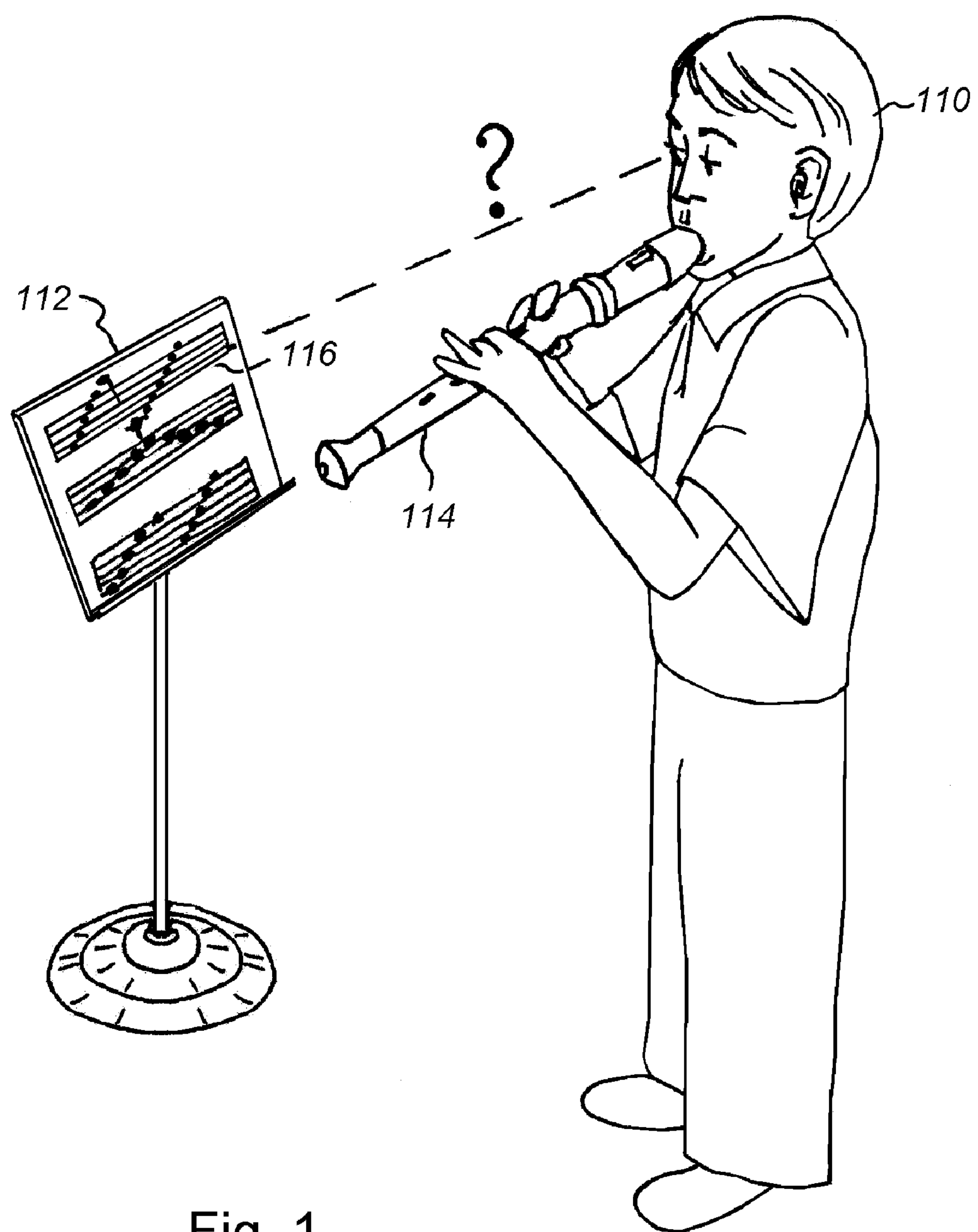
FIG. 1 is a perspective view of a typical way for a child or other individual to learn and play an instrument such as the depicted recorder.

FIG. 1 shows a perspective view of a typical way for a child 110 or other individual to learn and play a musical instrument such as the depicted recorder 114 according to a conventional technique. The child 110 reads a note 116 on sheet music 112 and attempts to play that particular note on the recorder 114. That is, recognition of the note 116 and corresponding manipulation of the fingers requires the child 110 to know exactly where to place his or her fingers on the recorder 114. Disadvantageously, this technique requires the player to engage in several abstractions such as associating the notes with correct fingering and then implementing correct fingering.

The invention provides color-coded note indicators to be arranged on the instrument and corresponding color-coded sheet notes to facilitate the learning and playing of music and the direct association of the physical note on the score with the finger holes to be opened or closed.

Figure 2:
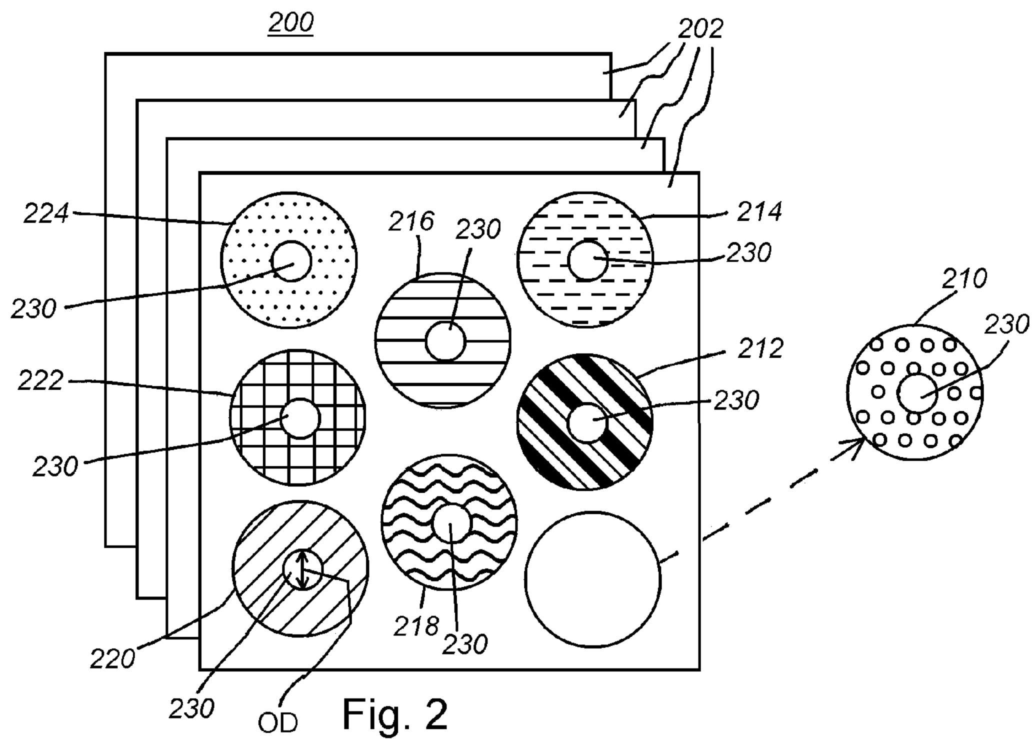
FIG. 2 is a schematic view of a set of removable, self-adhesive note indicators in a plurality of discrete colors for use with a recorder or other woodwind instrument according to an illustrative embodiment.

Referring now to FIG. 2, a set 200 of removable, self-adhesive note indicators on a plurality of backing sheets 202 in a plurality of discrete colors for use with a recorder or other woodwind instrument is shown according to an illustrative embodiment. A discrete set 200 of note indicators needed for one instrument is illustratively supplied on a single sheet 202 and individual note indicators 210-224 define a plurality of differing and discrete colors. For example, note indicator 210 is red, note indicator 212 is green, and note indicator 214 is blue. Alternatively, the individual note indicators 210-224 can be supplied on sheets that each have the same discrete color. For example, all note indicators on a single sheet are red, another sheet contains all green note indicators, and another sheet contains all blue note indicators (not shown). This arrangement can be used where a multiplicity of recorders are being set up in the illustrative system. Likewise a plurality of each color can be arranged in "stripes" across sheets, with several different colors on each sheet. Since the note indicators are removable and rearrangable, the note indicators are made of a durable material, such as vinyl sheet. A self-adhesive compound on the back surface of the note indicators allows for initial adhesion and, optionally, removability and rearrangement on an instrument. As shown, the note indicators are annular and are sized to be placed over the note holes of a woodwind instrument like a recorder, with the central opening 230 being sufficient in diameter to allow free access to the instrument finger hole. More generally, the note indicators are sized with sufficient clearance to not interfere with the holes of the instrument—that is the diameter OD provides clearance for the hole and any detented surface or depression that surrounds it.

While not shown, the sheets 202 can be part of a kit that also includes printed instructions on where and how to place the note indicators. The instructions can be printed or available with an accompanying software disk and/or with a website link. As noted below the kit can also include printed or software/web-based music scores that provide a variety of easily playable tunes with color coding of notes as also described below in further detail.

Figure 3:
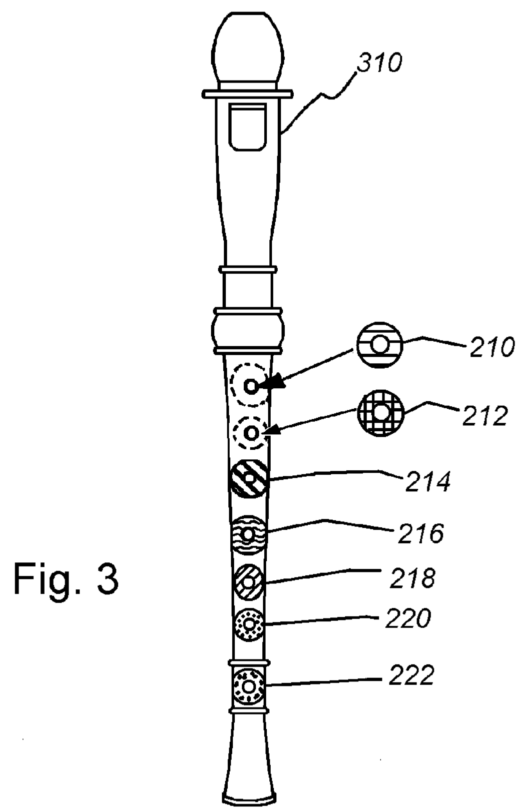
FIG. 3 is a schematic view of each of the set of note indicators of FIG. 2 being arranged on an exemplary recorder.

FIG. 3 shows the set 200 of note indicators 210-222, note indicator 224 being omitted in this example, of FIG. 2 being arranged on the holes of an exemplary recorder 310. The individual note indicators 210-222 are arranged on a recorder corresponding to the notes on sheet music 500 of FIG. 5 (described below).

Figures 4, 5:
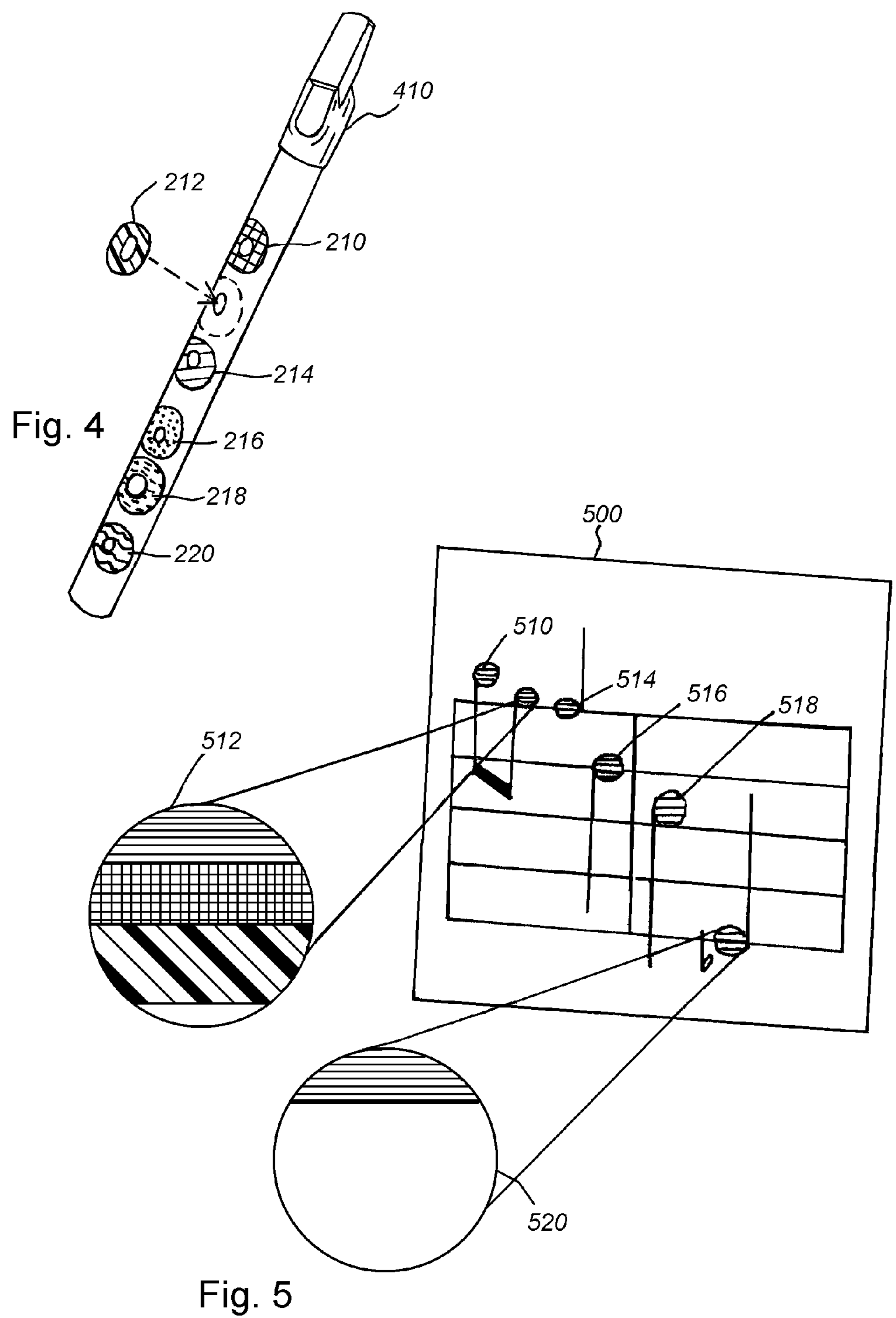
FIG. 4 is a perspective view of the set of note indicators of FIG. 2 being arranged on an exemplary penny whistle in an alternative embodiment.
FIG. 5 is a schematic view of sheet music in accordance with the illustrative embodiment employing the color-coded notes that correspond with the color-coded note indicators on the instrument.

A penny whistle 410 with the set 200 of note indicators is shown in FIG. 4 as another exemplary embodiment. Finger-holed woodwind instruments are not limited to these examples and alternative embodiments can include other finger-holed woodwind instruments, such as a flute or the chanter of a bagpipe. Appropriate instructions for outfitting such instruments with annular note indicators can be provided.

FIG. 5 is a schematic view of sheet music 500 in accordance with the illustrative embodiment employing the color-coded sheet notes 510-520 that correspond with the set of color-coded note indicators 210-222 on an instrument. For example, sheet note 512 illustrates a traditionally located quarter note "G" having a note head and stem. Sheet note 512 further indicates that the note head contains the color-coded indicia. In an illustrative embodiment, the sheet music 500 can be large in size, such as the size of a newspaper, with the sheet notes sized to match the large scale bars. For example, the sheet notes 510-520 can have a diameter of about 0.5-3 inches. Alternatively, instead of being displayed on paper, sheet music 500 can be displayed on a computer screen or projected using an appropriate projection device. Additionally, sheet music 500 can be displayed via a projector onto a surface like a wall or projector screen.

In an illustrative embodiment, the note heads are filled with a series of discrete horizontal stripes, each indicating the color of a note indicator or the instrument to be opened (or closed in an alternative embodiment) to play the note. Alternatively, the stripes can be vertical or slanted, or some other arrangement of the discrete colors to fill the note head can be implemented. For example, the colors can be provided as concentric circles/rings. Likewise, while colors tend to be as easy differentiation, in some examples patterns, (e.g. polka dots, checks, etc.) can differentiate note indicators. For certain learners or color-challenged individuals this may provide a desirable alternative. Thus, as used herein terms like color and color-coded should include differing patterns of like colors.

Figure 6:
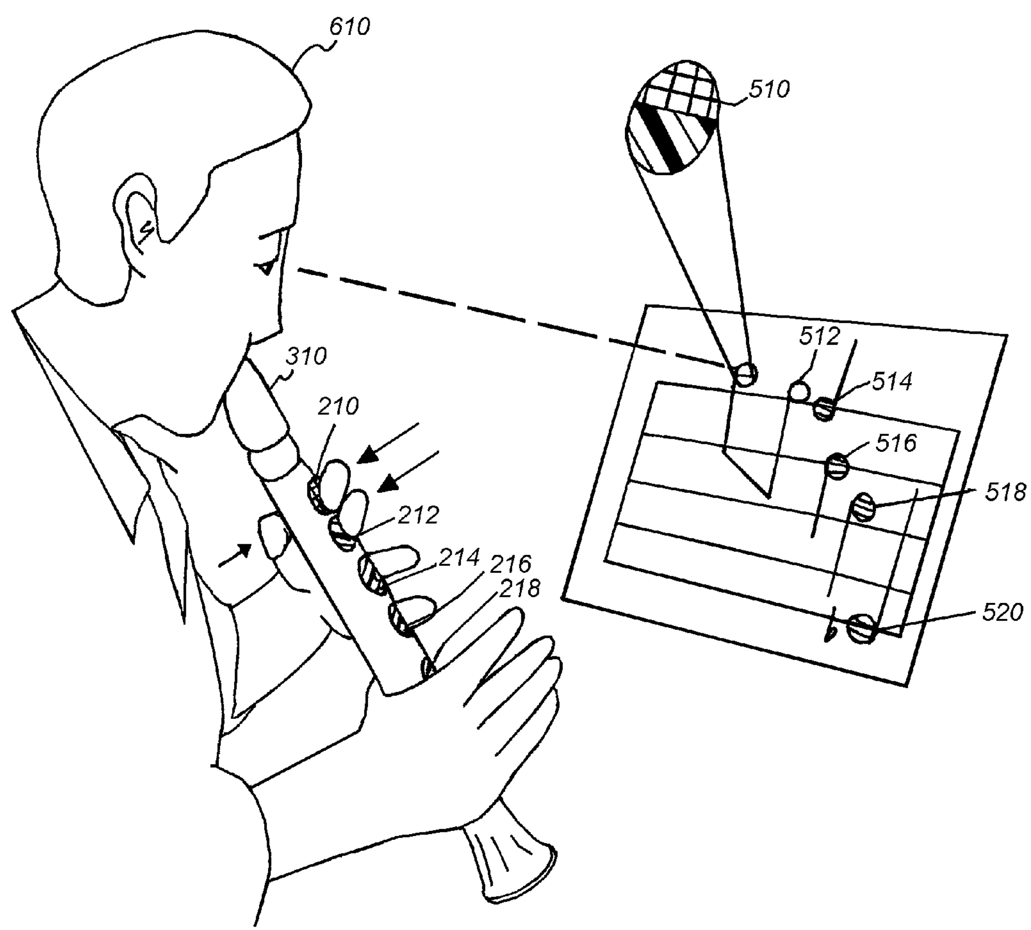
FIG. 6 is a perspective view of a child playing a recorder with the set of arranged note indicators thereon while the child reads sheet music with notes having colored-in note heads in which each of the colors corresponds to a selected note indicator according to an illustrative embodiment.

FIG. 6 shows the system in an illustrative embodiment. That is, a child 610 is shown playing a recorder 310 having the set of arranged note indicators 200. The child 610 begins reading sheet music 500 having sheet notes 510 to 520 that correspond with the note indicators 200. As illustrated on sheet music 500 of FIG. 6, the child 610 recognizes note "A" by the placement of the sheet note 510 and corresponding colors, red and green. Subsequently, the child 610 plays note "A" on the recorder 310 by manipulating his or her fingers to the corresponding sheet note by covering the first two holes having note indicators 210 and 212, respectively, and bottom hole as shown on recorder 310. The bottom hole can generally omit an indicator as it is often not visible.

Unlike systems which supplement a plain note, the color-coded notes direct the player's attention to the physical notes, removing at least one potential abstraction from the process of correlating the note with the proper finger positions. The note itself contains all needed information for playing it. The position on the scale reinforces the color indicators for fingering, and over time, the player substitutes colors for note locations on the scale. The timing of the note can be contained by appropriate indicia. In most cases, it is the presence or absence of a stem or flag. For example, all whole notes lack a stem, while quarter notes, etc. include a stem and (where appropriate in the case of eight-notes, etc.) a flag. The differentiation between a half note and a quarter note can be made by an extra thick black boundary on, for example, the half note.

It should be clear from the above description that the system provided herein facilitates the learning and playing of music by associating notes on sheet music with the notes on an instrument. The various materials and arrangements of materials should be readily apparent to those of ordinary skill.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, the arrangement of note indicators on the self-adhesive sheet in highly variable. Likewise in some embodiments instruments can be provided with pre-applied note indicators that are molded-in, painted on or otherwise permanently applied. A kit would include one or more instruments along with instructions for use and printed/software/web-based music scores. Accordingly, this description is meant to be taken only by way of example, and not to otherwise limit the scope of this invention.

What is claimed is:

1. A system for associating sheet notes with a woodwind instrument having finger holes, the system comprising:

a kit holding a plurality of note indicators, wherein the note indicators are each provided with each of a plurality of discrete color-codes and a self adhesive backing and define an annulus having a circular aperture matching a size and a shape of the finger holes so as to fully surround each of the finger holes and maintain an opening in each of the finger holes, and arranged to be located around the perimeter of each of the finger holes respectively so that the finger holes can be selectively opened and closed by a player's fingers; and a sheet music having a plurality of sheet notes, wherein each of the sheet notes includes a head defining one or more colors that correspond to one or more of the respective color-codes on the note indicators, so that closing the finger holes that correspond to the one or more of the respective color-codes on the note indicators plays a musical version of each of the sheet notes, respectively when the woodwind instrument is blown.

2. The system as set forth in claim 1 wherein the color-coded sheet notes are striped in at least two of the colors to correspond to the selection of a plurality of the finger holes with note indicators having the corresponding color codes.

3. The system as set forth in claim 1 wherein the woodwind instrument is a recorder.

4. The system as set forth in claim 1 wherein the sheet music is generated by a computer.

5. The system as set forth in claim 1 wherein the sheet music is displayed on a computer screen.

6. The system as set forth in claim 1 wherein the sheet music is projected onto a surface.

7. The system as set forth in claim 1 wherein the note indicators are stored on a backing material holding a plurality of note indicators.

8. The system as set forth in claim 1 wherein at least some of the note indicators are stored on a discrete and separate backing material from each other.

* * * * *